US010102648B1

(12) United States Patent
Vannier et al.

(10) Patent No.: US 10,102,648 B1
(45) Date of Patent: Oct. 16, 2018

(54) BROWSER/WEB APPS ACCESS TO SECURE SURFACE

(71) Applicant: GOOGLE INC., Mountain View, CA (US)

(72) Inventors: Eric Vannier, Union City, CA (US); David Kimbal Dorwin, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 640 days.

(21) Appl. No.: 13/712,538

(22) Filed: Dec. 12, 2012

Related U.S. Application Data

(60) Provisional application No. 61/569,755, filed on Dec. 12, 2011.

(51) Int. Cl.
*G06T 11/00* (2006.01)
*G06F 21/10* (2013.01)
*G06F 21/50* (2013.01)

(52) U.S. Cl.
CPC .............. *G06T 11/00* (2013.01); *G06F 21/10* (2013.01); *G06F 21/50* (2013.01)

(58) Field of Classification Search
CPC .......... G06F 21/10; G06F 21/00; G06F 21/71; G06F 21/126; H04L 2463/101;

(Continued)

(56) References Cited

U.S. PATENT DOCUMENTS 4,535,355 A    8/1985 Arn et al.
4,694,489 A    9/1987 Frederiksen
(Continued)

FOREIGN PATENT DOCUMENTS

EP    0658054 A2    6/1995
EP    0714204 A2    5/1996
(Continued)

OTHER PUBLICATIONS

Kloskowski, Matt. "4." Layers: The Complete Guide to Photoshop's Most Powerful Feature. Berkeley, CA: Peachpit, Oct. 29, 2010.*

(Continued)

*Primary Examiner* — Gregory J Tryder
*Assistant Examiner* — Scott E Sonners
(74) *Attorney, Agent, or Firm* — Brake Hughes Bellermann LLP

(57) ABSTRACT

Embodiments are directed towards generating an image from a plurality of content layers. The content layers may include secure content that overlaps at least one other content layer. When the image is generated, the secure content may be rendered as a layer below the plurality of content layers. Additionally, each area of content layers that is overlapped by an area of the secure content may be modified to be transparent, where the area of the secure content is visible in the image through each transparently modified area. In some embodiments, an alpha channel value of each pixel in each area of content layers that is overlapped by the secure content may be modified. Secure content and unsecure content at a same layer may be split into different layers, where the unsecure content layer may be rendered at a theoretical secure content layer.

17 Claims, 8 Drawing Sheets

(58) Field of Classification Search
CPC ............. H04L 63/0428; H04L 2209/60; H04L 2463/102; H04L 2463/103; H04L 2209/603; H04L 63/16; H04L 63/168; H04L 65/4084; H04L 65/60; H04L 65/4076; H04L 65/4092; H04L 65/604; H04N 21/4627; Y10S 707/99939
See application file for complete search history.

(56) References Cited

U.S. PATENT DOCUMENTS

| | | |
|---|---|---|
| 5,067,035 A | 11/1991 | Kudelski et al. |
| 5,134,656 A | 7/1992 | Kudeiski |
| 5,144,663 A | 9/1992 | Kudelski et al. |
| 5,191,611 A | 3/1993 | Lang |
| 5,339,413 A | 8/1994 | Koval et al. |
| 5,375,168 A | 12/1994 | Kudelski |
| 5,392,351 A | 2/1995 | Hasebe et al. |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,165,175 B1 | 1/2007 | Kollmyer et al. |
| 7,356,143 B2 | 4/2008 | Morten |
| 7,562,397 B1* | 7/2009 | Mithal .............. G06Q 30/0235 705/52 |
| 7,640,435 B2 | 12/2009 | Morten |
| 7,805,616 B1 | 9/2010 | Mohammed et al. |
| 7,817,608 B2 | 10/2010 | Rassool et al. |
| 7,953,882 B2 | 5/2011 | Shukla et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0049679 A1 | 4/2002 | Russell et al. |
| 2002/0089410 A1 | 7/2002 | Janiak et al. |
| 2002/0104004 A1 | 8/2002 | Couillard |
| 2002/0141582 A1 | 10/2002 | Kocher et al. |
| 2003/0007568 A1 | 1/2003 | Hamery et al. |
| 2003/0046568 A1 | 3/2003 | Riddick et al. |
| 2004/0031856 A1 | 2/2004 | Atsmon et al. |
| 2004/0117500 A1 | 6/2004 | Lindholm et al. |
| 2004/0151315 A1 | 8/2004 | Kim |
| 2004/0184616 A1 | 9/2004 | Morten |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2006/0020811 A1 | 1/2006 | Tan |
| 2006/0066637 A1* | 3/2006 | Hamburg ...................... 345/629 |
| 2006/0212363 A1 | 9/2006 | Peinado et al. |
| 2006/0280150 A1 | 12/2006 | Jha et al. |
| 2007/0160208 A1 | 7/2007 | MacLean et al. |
| 2007/0209005 A1 | 9/2007 | Shaver et al. |
| 2007/0219917 A1 | 9/2007 | Liu et al. |
| 2007/0294170 A1 | 12/2007 | Vantalon et al. |
| 2008/0027871 A1 | 1/2008 | Seo |
| 2008/0098229 A1* | 4/2008 | Hartrell et al. ............... 713/176 |
| 2008/0147671 A1 | 6/2008 | Simon et al. |
| 2008/0155673 A1 | 6/2008 | Jung et al. |
| 2008/0313264 A1 | 12/2008 | Pestoni |
| 2009/0007198 A1 | 1/2009 | Lavender et al. |
| 2009/0031408 A1 | 1/2009 | Thom et al. |
| 2009/0044008 A1 | 2/2009 | Lim |
| 2009/0183001 A1 | 7/2009 | Lu et al. |
| 2009/0208016 A1 | 8/2009 | Choi et al. |
| 2009/0249426 A1 | 10/2009 | Aoki et al. |
| 2009/0322786 A1* | 12/2009 | Finger et al. ................ 345/629 |
| 2010/0023760 A1 | 1/2010 | Lee et al. |
| 2010/0027974 A1 | 2/2010 | Ansari |
| 2010/0145794 A1 | 6/2010 | Barger et al. |

(56) References Cited

U.S. PATENT DOCUMENTS

| | | | |
|---|---|---|---|
| 2010/0180289 A1 | 7/2010 | Barsook et al. | |
| 2010/0211776 A1 | 8/2010 | Gunaseelen et al. | |
| 2010/0242097 A1 | 9/2010 | Notes et al. | |
| 2010/0299701 A1 | 11/2010 | Liu et al. | |
| 2011/0179283 A1 | 7/2011 | Thom et al. | |
| 2011/0225417 A1 | 9/2011 | Maharajh et al. | |
| 2011/0314284 A1 | 12/2011 | Chou | |
| 2011/0321139 A1* | 12/2011 | Jayaraman | G06F 21/51 726/4 |
| 2012/0066494 A1 | 3/2012 | Lee et al. | |
| 2012/0117183 A1 | 5/2012 | Wang et al. | |
| 2012/0173884 A1 | 7/2012 | Patil | |
| 2012/0317414 A1 | 12/2012 | Glover | |
| 2012/0331293 A1 | 12/2012 | Ma et al. | |
| 2013/0072126 A1 | 3/2013 | Topaltzas et al. | |
| 2013/0097302 A9 | 4/2013 | Khedouri et al. | |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 9/2001 |
| EP | 1246463 A2 | 10/2002 |
| JP | 03203432 A | 9/1991 |
| JP | 08335040 A | 12/1996 |
| JP | 10336128 A | 12/1998 |
| JP | 11175475 A | 7/1999 |
| JP | 2000022680 A | 1/2000 |
| JP | 2000196585 A | 7/2000 |
| JP | 2000293945 A | 10/2000 |
| JP | 2001251599 A | 9/2001 |
| WO | 1996/06504 A1 | 2/1996 |
| WO | 1996/32702 A1 | 10/1996 |
| WO | 1999/21364 A1 | 4/1999 |
| WO | 1999/28842 A1 | 6/1999 |
| WO | 1999/30499 A1 | 6/1999 |
| WO | 19999/54453 A1 | 10/1999 |
| WO | 2001/35571 A1 | 5/2001 |
| WO | 2001/93212 A2 | 12/2001 |
| WO | 2002/21761 A2 | 3/2002 |
| WO | 2004/02112 A1 | 12/2003 |

OTHER PUBLICATIONS

Official Communication for U.S. Appl. No. 13/586,664 dated Dec. 26, 2013.

Official Communication for U.S. Appl. No. 13/586,664, dated Jun. 20, 2013.

"A new approach to browser security: the Google Chrome Sandbox," Chromium Blog, http://blog.chromium.org/2008/10/new-approach-to-browser-security-google.html, 5 pages, Oct. 2, 2008.

"Conditional access," Wikipedia, the free encyclopedia, http://en.wikipedia.org/wiki/Conditional_access, 8 pages, created Jul. 7, 2005.

"Digital rights management," Wikipedia, the free encyclopedia, last modified Mar. 30, 2012, 30 pages http://en.wikipedia.org/w/index.php?title=Digital_rights_management&printabl=yes.

"Encrypted Media Extensions, W3C Editor's Draft Dec. 17, 2012," W3C, http://dvcs.w3.org/hg/html-media/raw-file/tip/encrypted-media/encrypted-media.html, 32 pages, created Feb. 22, 2012, current draft dated Dec. 17, 2012.

"Establishing Interconnectivity among Various Makers' Products through Standardization of VOD Protocol", NTT Corporation Press Release, Sep. 27, 2002 http://www.ntt.co.jp/news/news02e/0209/020927.html.

"Getting Started: Background and Basics—The Chromium Projects," http://chromium.org/nativeclient/getting-started/getting-started-background-and-basics, 4 pages, Sep. 2, 2008.

"Google Native Client," Wikipedia, the free encyclopedia, http://en.wikipedia.org/wiki/Google_Native_Client, 6 pages, created Dec. 9, 2008.

"High-bandwidth Digital Content Protection," Wikipedia, the free encyclopedia, last modified Nov. 14, 2012, 7 pages http://en.wikipedia.org/w/index.php?titie=High-bandwidth_Digital_Content_Protection&printable=yes.

"HTML5," Wikipedia, the free encyclopedia, http://en.wikipedia.org/wiki/HTML5, 9 pages, created Nov. 16, 2006.

"Intelligent Systems for Finance and Business," Goonatilake, S. et al., eds., Chapters 2-10, 1995, pp. 31-173.

"Irdeto Access and Optibase create Strategic Alliance", Press Release, Irdeto Access, Dec. 14, 2000 pp. 1-4 http://www.irdetoaccess.com/press/0000041.htm.

"Irdeto Access and Optibase create Strategic Alliance", Press Release, Optibase, Dec. 14, 2000, pp. 1-2 http://www.optibase.com/html/news/December_14_2000.html.

"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.

"Media Source Extensions," http://html5-mediasource-api.googlecode.com/svn/trunk/draft- spec/mediasource-draft-spec.html, 1 page, Jul. 11, 2011.

"MediaSource Extensions v0.3," editor A. Colwell, http://html5-mediasource-api.googlecode.com/svn/tags/0.3/draft-spec/mediasource-draft-spec.html, 14 pages, Mar. 13, 2012.

"Multimedia over Coax Alliance," Wikipedia, the free encyclopedia, http://en.wikipedia.org/wiki/Multimedia_over_Coax_Alliance, 4 pages, created Jun. 11, 2006.

"PlayReady," Wikipedia, the free encyclopedia, last modified Jan. 30, 2012, 2 pages http://en.wikipedia.org/w/index.php?title32 PlayReady&printable=yes.

"Sandbox—The Chromium Projects," http://dev.chromium.org/developers/design-documents/sandbox, 8 pages, Sep. 2, 2008.

"Scalable Video Coding," Wikipedia, the free encyclopedia, last modified Sep. 10, 2012, 4 pages http://en.wikipedia.org/w/index.php?title=Scalable_Video_Coding&printable=yes.

"UltraViolet (system)," Wikipedia, the free encyclopedia, last modified Feb. 20, 2012, 5 pages http://en.wikipedia.org/w/index.php?title=UltraViolet_(system)&printable=yes.

"W3C HTML Working Group," http://www.w3.org/html/wg, 9 pages, May 9, 2007.

"Web Cryptography Working Group Charter," W3C Technology and Society domain, http://www.23.org/2011/11/webcryptography-charter.html, 6 pages, Apr. 3, 2012.

"What is HDCP (high definition copy protocol)?"Digital Connection, 2005, 2 pages http://www.digitalconnection.com/FAQ/HDTV_12.asp.

Balthrqp, J. et al., "Coverage and Generalization in an Artificial immune System", Proceedings of Genetic and Evolutionary Computation Conference (GECCO), Jul. 2002, pp. 1-8.

Barth, A. et al., "The Security Architecture of the Chromium Browser," Technical Report, Stanford University, 2008.

Blumenfeld, S. M., "Streaming Media—System Security," Broadcast Engineering Magazine, Oct. 2001, pp. 1-2.

Canadian Examiner Report for Application No. 2,559,323 dated May 6, 2008, 3 pages.

Cheng, H. C. H., "Partial Encryption for Image and Video Communication", Department of Computing Science, University of Alberta, Fall 1998, pp. 1-87.

Cheng, H. et al., "Partial Encryption of Compressed images and Videos", IEEE Transactions on Signal Processing, vol. 48, No. 8, Aug. 2000, pp. 2439-2451.

Deitcher; D., "Secure Implementations of Content Protection (DRM) Schemes on Consumer Electronic Devices," Discretix, White Paper, May 2011, 17 pages.

Eskicioglu, A. M. et al., "An Overview of Multimedia Content Protection in Consumer Electronics Devices", SP:IC, vol. 16 No. 7, Apr. 2001, pp. 681-699.

Ferrill, E. et al., "A Survey of Digital Watermarking", Feb. 25, 1999, 15 pages http://elizabeth.ferrill.com/papers/watermarking.pdf.

Forrest. S., "Research Projects," Dec. 2003, pp. 1-3 http://www.cs.unm.edu/.about.forrest/projects.html.

Glazkov, D., "What the Heck is Shadow DOM?," http://glazkov.com/2011/01/14/what-the-heck-is-shadow-dom, 14 pages, Jan. 14, 2011.

(56) References Cited

OTHER PUBLICATIONS

Goodman, J. et al., "Low Power Scalable Encryption for Wireless Systems", Wireless Networks, No. 4, Jan. 1998, pp. 55-70.

Griwodz, C. et al, "Protecting VoD the Easier Way", ACM Multimedia, Bristol, UK, Jan. 1998, pp. 21-28.

Griwodz, C. "Video Protection by Partial Content Corruption", Multimedia and Security Workshop at ACM Multimedia, Bristol, UK, Sep. 1998, pp. 1-5.

Hunter, J., et al., "A Review of Video Streaming Over the Internet", DSTC Technical Report TR97-10, Aug. 1997, pp. 1-28.

International Search Report and Written Opinion for International Patent Application No. PCT/US07/62055 dated Sep. 11, 2007.

Kirovski, D. et al, "Digital Rights Management for Digital Cinema", Proceedings of the SPIE, Bellingham, VA, vol. 4472, Jul. 31, 2001, p. 105-120.

Metz, C., "Google Native Client: The web of the future ~ or the past?" The Register, http://www.theregister.co.uk/2011/09/12/google_native_client_from_all_sides/print.html, 13 pages, Sep. 12, 2011.

Office Action for European Patent Application No. 05250968.4 dated Jan. 26, 2006.

Official Communication for Chinese Patent Application No. 2004800071571 dated Apr. 13, 2007.

Official Communication for European Patent Application No. 04757582.4 dated May 22, 2007.

Omneon Video Networks Product Announcement, "Broadband Streaming—Omneon and BSkyB", TB-1006-1, 1998, pp. 1-4.

Schulzrinne, H., et al., "Real Time Streaming Protocol (RTSP)," RFC 2326, Apr. 1998, pp. 1-86.

Schulzrinne, H., et al., "RTP: A Transport Protocol for Real-Time Applications", RFC 1889, Jan. 1996, pp. 1-75.

Search Report for European Patent Application No. 05250968.4 dated Oct. 12, 2005.

Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.

Supplementary European Search Report for European Patent Application No. 00986215 dated Nov. 14, 2005.

Supplementary European Search Report for European Patent Application No. 04757682.4 dated Nov. 20, 2006.

Teixeira, L. M. et al, "Secure Transmission of MPEG Video Sources", Proceedings of IEEE Workshop on ISPACS, Nov. 6, 1998, pp. 1-5.

Wu, T.-L. et al., "Selective Encryption and Watermarking of MPEG Video (Extended Abstract)", submitted to International Conference on Image Science, Systems, and Technology, Feb. 17, 1997, 10 pages.

Yee, B. et al,, "Native Client: A Sandbox for Portable, Untrusted x86 Native Code," IEEE Symposium on Security and Privacy, Oakland 2009, 15 pages, May 16-19, 2009.

Yoshida, K. et al., "A Continuous-Media Communication Method for Minimizing Playback Interruptions", IS&T/SPIE Conference on Visual Communications and Image Processing, San Jose, California, vol. 3653, Jan. 1999, 10 pages.

Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.

Official Communication for U.S. Appl. No 13/437,789 dated Aug. 14, 2013.

Official Communication for U.S. Appl. No. 13/437,789 dated Mar. 26, 2013.

Colwell, A., "Proposal for a MediaSource API that allows sending media data to a HTMLMediaElement," Jul. 11, 2011, pp. 1-11 http://lists.whatwg.org/pipermail/whatwg-whatwg.org/2011—Jul./032384.html.

Official Communication for U.S. Appl. No. 13/437,789 dated Nov. 13, 2013.

Official Communication for U.S. Appl. No. 13/532,734 dated Oct. 23, 2013.

Official Communication for U.S. Appl. No. 13/654,237 dated Oct. 23, 2013.

Official Communication for U.S. Appl. No. 13/654,271 dated Oct. 24, 2013.

Official Communication for U.S. Appl. No. 13/712,764 dated Nov. 7, 2013.

\* cited by examiner

BROWSER/WEB APPS ACCESS TO SECURE SURFACE

CROSS REFERENCE TO RELATED APPLICATIONS

This non-provisional patent application claims the benefit under 35 U.S.C. § 119(e) of U.S. Provisional Patent Application, Ser. No. 61/569,755 filed on Dec. 12, 2011, entitled "Encrypted Media Extensions for HTML 5 and DRM," which is incorporated herein by reference.

TECHNICAL FIELD

The present invention relates generally to content management, and more particularly, but not exclusively, to enabling display of secure content where the secure content may be rendered as a layer below a plurality of overlapping content layers.

BACKGROUND

Today, the internet enables users to access a variety of different kinds of content from a variety of different web pages. Typically, web pages may be constructed from a plurality of different content layers. These content layers may include secure content, such as restricted access content, and/or unsecure content, such as advertisements. Examples of content layers may include, but are not limited to, a background and/or other graphics, video content, playback controls, advertisements, or the like. Usually, a user can access a web page through a web-enabled browser. Such a browser can request the web page and receive the content layer associated with that web page. The browser may then combine these layers for rendering to be displayed to a user. However, if at least one of the layers includes secure content and the browser is compromised by an attacker, then it may be possible for the attacker to obtain unauthorized access and/or retrieval of the secure content. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
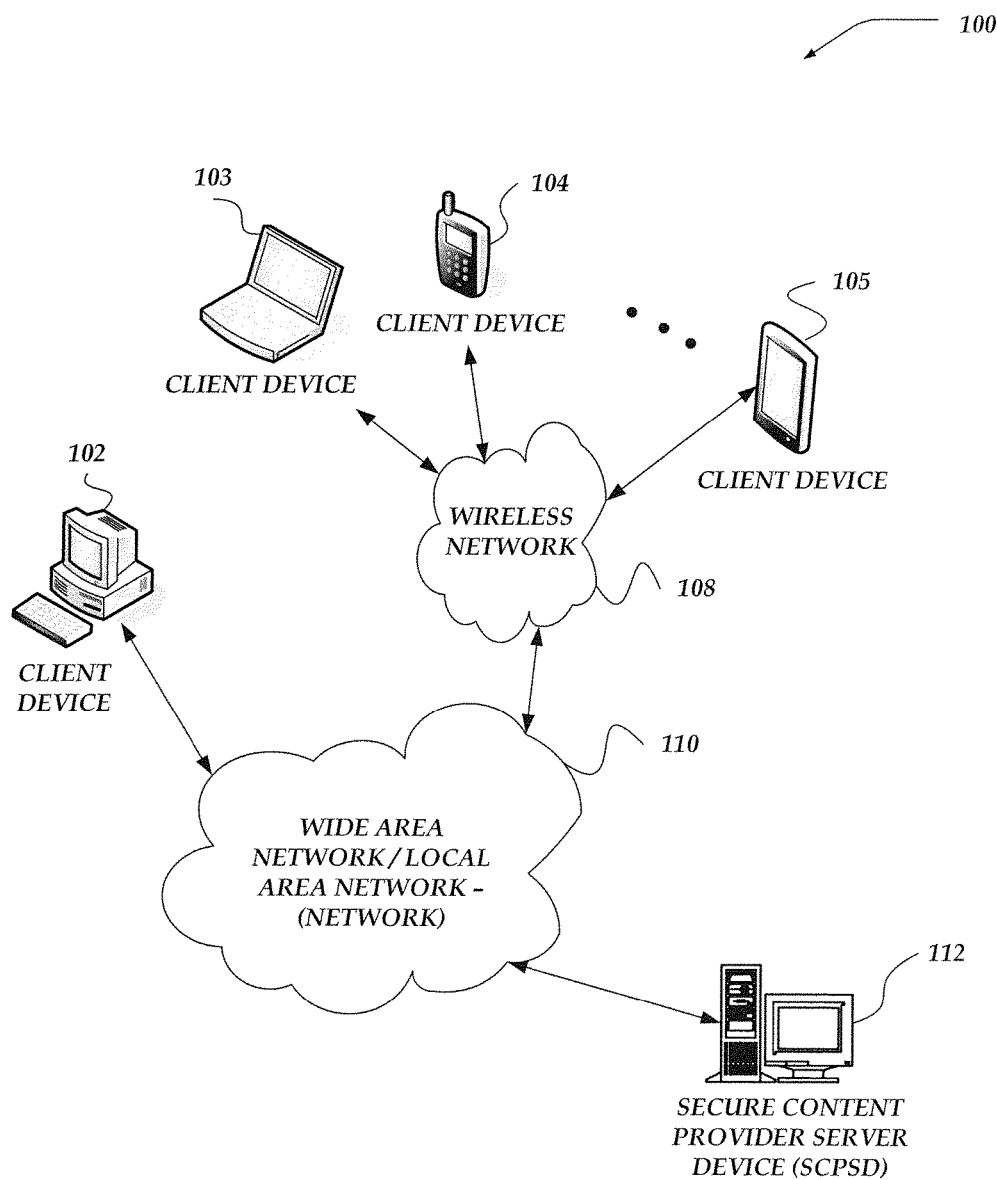
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" may refer to digital data that may be displayed within and/or otherwise provided to a user through a browser application. In at least one embodiment, content may be communicated over a network to be remotely displayed by a computing device. Non-exhaustive examples of content include but are not limited to movies, videos, pictures, illustrations, graphics, images, animations, text, or the like. In some embodiments, content may be secure content and/or unsecure content. As used herein, the term "secure content" may refer to content with restricted access. Examples of secure content include, but are not limited to, premium content, for pay content, time and/or device restricted content, encrypted content, other high value content, or the like.

As used herein, the term "content layers," may refer to content that is layered such that at least a portion of a first content overlaps at least another portion of a second content. In at least one embodiment, a first content layer that is overlapped by a second layer may be referred as being below the second layer and the second layer may be referred to as being above the first layer. In some embodiments, content layers may be in a z-order stack, where each layer is at a different z-order position. In some embodiments, the content layers may include the z-order position, a location of the content (e.g., within a window, image, or the like), a size of the content, a transparency of the content, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to generating an image from a plurality of overlapping content layers to be displayed. In at least one of various embodiments, the plurality of content layers may be in a z-order stack with at least a bottom layer and a top layer. In some embodiments, at least one of the plurality of content layers may include secure content (which may be referred to as a theoretical secure content layer). When the image is generated, the secure content may be rendered as a new layer below the plurality of content layers. Embodiments described herein may be employed dynamically as layers change and/or are updated, as layers are inserted/removed to/from the document object model, based on modifications to each layer in a stack (e.g., by location, z-order position, graphical/visual content that includes changes in z-order, or the like), or the like, or any combination thereof.

Additionally, a transparency of each area of content layers that is overlapped by an area of the secure content may be modified, where the area of the secure content may be visible in the image through each transparently modified area. The transparency of each overlapped area may be modified to be fully transparent or partially transparent. Accordingly, some content layers may include fully transparent overlapped areas and other layers may include partially transparent overlapped areas. The transparency may be modified point by point, pixel by pixel, at sub-pixel positions, or the like, which may depend on an implementation of the webpage and/or browser (e.g., positioning based on non-integer positions of the screen). In some embodiments, the transparency may be modified by modifying an alpha channel value of each pixel, point, sub-pixel position, or the like, in each area of content layers that is overlapped by the secure content.

In at least one embodiment, the area of the secure content may be visible through each transparently modified area, but may not be displayed and/or viewable to a user based on an orientation, configuration, or other characteristic of other content layers. In one non-limiting, non-exhaustive example, the secure content (or a portion thereof) may not be displayed to a user if an opaque layer (e.g., an advertisement) overlaps the secure content (or a portion thereof). In another non-limiting, non-exhaustive example, a plurality of videos may be instantiated, but one video may be displayed at a time. In this example, each video may be secure content and may not be displayed until attached to the document object model, a change their z-order or other elements in the page that may cause a video to be displayed, or the like. In at least one such example, a main video element (i.e., what the user want to watch) and other video elements (like video advertisements) may be instantiated—the web page may control which element gets displayed at a given time, e.g., presenting the advertisements as the business logic of the site dictates. However, embodiments are not so limited; but rather, in some embodiments, a plurality of videos may be displayed at a same time in a same web page, where each video may be rendered in a different secure content layer, which, as described in more detail below, may minimize attacks from one secure content layer to another.

In some embodiments, if the content layer with the secure content also includes unsecure content, then the secure content and the unsecure content may be split into different layers. In at least one such embodiment, the split secure content layer may be rendered below the plurality of content layers (e.g., below a bottom layer of a z-order stack of the plurality of content layers) and the split unsecure content layer may be rendered at the theoretical secure content layer.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client devices 102-105, and Secure Content Provider Server Device (SCPSD) 112.

Embodiments of client devices 102-105 are described in more detail below in conjunction with FIG. 2. Briefly, in some embodiments, client devices 102-105 may be configured to enable display of an image generated from a plurality of content layers, wherein at least one content layer includes secure content.

In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. Client devices 102-105 may also include other types of devices, such as, but not limited to, televisions, set top boxes (STB), Blu-Ray devices, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like. In one embodiment, a user of the client device may employ the browser application to perform various activities over a network (online). However, another application may also be used to perform various online activities. As described in more detail below, some embodiments may be employed offline, such that a reliable network connection may not be required. Accordingly, some embodiments described herein may be employed to enable playback of secure content even if no network connectivity can be attained, or that the network characteristics are such that relying on the network solely may provide a sub optimal experience to the user.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. In another embodiment, client devices 102-105 may be identified based on non-device specific identifiers, such as, but not limited to, user login information, play tokens, or the like. Such information may be provided in a network packet, or the like, sent between other client devices, SCPSD 112, or other computing devices. However, embodiments are not so limited; rather, embodiments may or may not utilize a network connection and/or may or may not utilize SCPSD 112.

Client devices 102-105 may further be configured to include a client application that enables an end-user to log into an end-user account that may be managed by another computing device, such as SCPSD 112, or the like. Such end-user account, in one non-limiting example, may be configured to enable the end-user to manage one or more online activities, including in one non-limiting example, search activities, social networking activities, browse various websites, communicate with other users, or the like. In other embodiments, an end-user account may be configured to enable the end-user to access secure content at SCPSD 112. However, participation in such online activities may also be performed without logging into the end-user account.

In various embodiments, client devices 102-105 may include a content retrieval mechanism and a key/license retrieval mechanism. The content retrieval mechanism may be enabled to access secure content remotely (e.g., from SCPSD 112 through networks 110 and/or 108) and/or locally (e.g., from CDs, DVDs, Blu-Ray, or the like). The key/license retrieval mechanism may be enabled to retrieve and/or be provided a key for decrypting the secure content. In various embodiments, the key/license retrieval mechanism may obtain the key locally and/or remotely. In some embodiments, client devices 102-105 may be provided and/or obtain secure content and/or corresponding keys from one or more network devices, such as SCPSD 112. In at least one embodiment, client devices 102-105 may access secure content from one network device and retrieve corresponding keys from a same and/or a different network device. However, embodiments are not so limited, and content delivery and license/key delivery may be performed locally, remotely, or a combination thereof, or not at all (such as if playback of the secure content is based on time).

In some embodiments, the system may include one or more wireless networks (e.g., wireless network 108), one or more wired networks (e.g., network 110), or other type of communication (e.g., near filed communication).

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, SCPSD 112, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiments, set top boxes (STBs), TVs, or the like, may access a network through other technologies that may be considered wired or not, such as, but not limited to Ethernet over coax, network over power cables, even plain old phone lines, or the like. In some embodiments, a given license/key server (e.g., SCPSD 112) may be connected to an STB through other mechanisms than those listed above, such as, for example, proprietary protocols over coax.

In some other embodiments, a back channel to SCPSD 112 from client devices 102-105 (including STBs) may be synchronous and/or asynchronous. In at least one embodiment, a key generating device may be on board on the STB, which may, in some embodiments, be a Conditional Access Module (CAM). In some embodiments, the CAM may be found in the STB in the form of a smart card, chips on the motherboard on the STB, integrated in the SoC (System On a Chip) of the STB, or the like. The CAM may be capable of issuing licenses for the secure content with or without a bidirectional network connection. In at least one such embodiment, the secure content may be provided and/or retrieved by a client device through a downstream-only link (e.g., satellite, coax, or the like). In these cases, since there may not be a satellite uplink, there may not be a negotiation between the content server and the client device. The CAM may act as a broker for the keys to decrypt the secure content. In some embodiments, the CAM may then utilize an asynchronous uplink (e.g., a phone line) to charge purchases to access the secure content back to the servers to control use, which may be limited by a spending limit. In other embodiments, the CAM may not utilize an uplink and may utilize a secure clock to determine if playback of secure content may be enabled based on time.

One embodiment of SCPSD 112 is described in more detail below in conjunction with FIG. 3. Briefly, however, SCPSD 112 includes virtually any network device capable of storing, accessing, and/or providing secure (and/or unsecure) content to a client device, such as client devices 102-105. In some embodiments, SCPSD 112 may provide a plurality of content layers where at least one layer overlaps another layer (e.g., as a z-order stack). In at least one embodiment, at least one of the plurality of content layers may include secure content and other content layers may include unsecure content. In some embodiments, the secure content may overlap at least one other layer.

In some embodiments, SCPSD 112 may include a content provider and/or a key/license provider, which may be employed as a same network device or as different network devices. In some embodiments, secure content may be distributed through one means and a key for decrypting the secure content may be provided through a same means and/or another means. For example, in at least one embodiment, the secure content may be distributed freely (though encrypted) through one means, such as, but not limited to, Content Delivery Network (CDN), CDs, DVDs, Blu-Ray, or the like, and the key for decrypting the secure content may be provided by another means, such as from a network device (e.g., SCPSD 112).

Devices that may be arranged to operate as SCPSD 112 include various network devices, including, but not limited to personal computers, desktop computers, multiprocessor systems, microprocessor-based or programmable consumer electronics, network PCs, server devices, network appliances, and the like.

Although FIG. 1 illustrates SCPSD 112 as a single computing device, the invention is not so limited. For example, one or more functions of the SCPSD 112 may be distributed across one or more distinct network devices. Moreover, SCPSD 112 is not limited to a particular configuration. Thus, in one embodiment, SCPSD 112 may contain a plurality of network devices to provide secure and/or unsecure content to a client device. In another embodiment, SCPSD 112 may contain a plurality of network devices that operate using a master/slave approach, where one of the plurality of network devices of SCPSD 112 operates to manage and/or otherwise coordinate operations of the other network devices. In other embodiments, the SCPSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Devices

Figure 2:
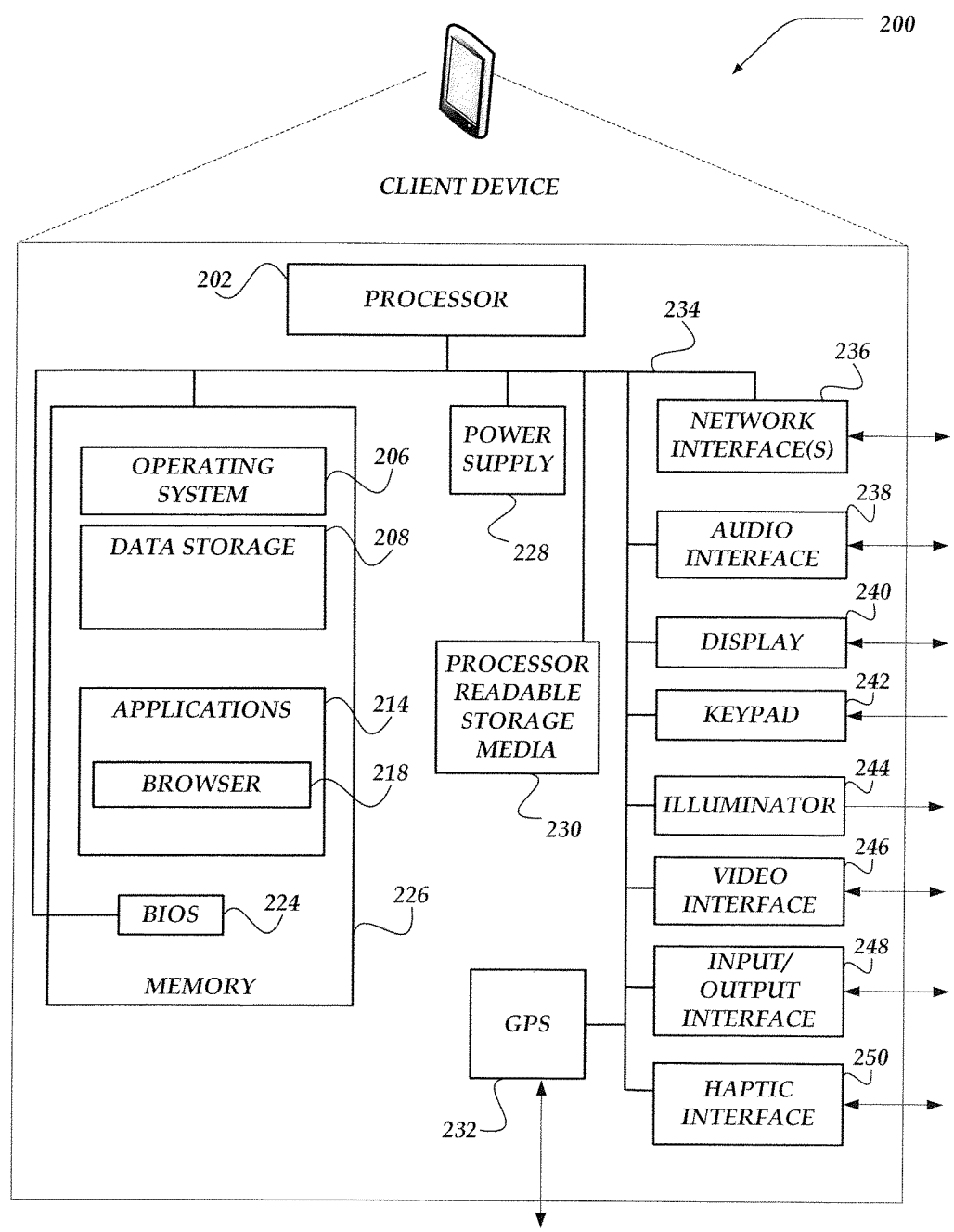
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Additionally, examples of the different components may not be exhaustive and client device configurations may change over time. Client device 200 may represent, for example, one embodiment of at least one of client devices 102-105 of FIG. 1.

As shown in the figure, client device 200 includes a processor 202 in communication with a memory 226 via a bus 234. In some embodiments, processor 202 may include one or more central processing units (CPU). Client device 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200. A rechargeable or non-rechargeable battery may be used to provide power. The power may also be provided by an external power source, such as, but not limited to, an alternating current (AC) adapter, a powered docking cradle, or the like, that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Input/output interface 248 may also enable communication with other remote control devices, such as, but not limited to, gesture based mechanisms, magic wands, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, satellite systems, wireless access point location, cell tower information, triangulation, assisted GPS (AGPS), Enhanced Observed Time Difference (E-OTD), Cell Identifier (CI), Service Area Identifier (SAD, Enhanced Timing Advance (ETA), Base Station Subsystem (BSS), or the like, to further determine the physical location of client device 200 on the surface of the Earth. It is understood that the precision of GPS transceiver 232 can vary under different system configurations and/or conditions. In one embodiment, however, mobile device 200 may through other components, provide other information that may be employed to determine a physical location of the device, including for example, a Media Access Control (MAC) address, IP address, or the like.

Memory 226 may include different types of storage means, which may include different types of persistent storage and/or different types of transient storage. Memory 226 illustrates an example of computer readable storage media (devices) for storage of information such as computer readable instructions, data structures, program modules or other data. Memory 226 stores a basic input/output system (BIOS) 224 for controlling low-level operation of client device 200. However, embodiments are not so limited and other standards and/or specifications (e.g., Unified Extensible Firmware Interface) may be utilized to control low-level operations of client device 200.

The memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Phone™, Apple Corporation's iOS™, Google Corporation's Android™, or the Symbian® operating system. In other embodiments, client device 200 may include a custom or otherwise specialized operating system. The operating system may include, or interface with one or more virtual machine modules that enable control of hardware components and/or operating system operations. Such virtual machines may be written in a number of different programming languages, such as Java, javascript, C#, .net, or the like.

Memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of network device 200, including, but not limited to processor readable storage media 230, a disk drive or other computer readable storage devices (not shown) within client device 200.

Processor readable storage media 230 may include volatile, nonvolatile, removable, and non-removable media implemented in any method or technology for storage of information, such as computer- or processor-readable instructions, data structures, program modules, or other data. Examples of computer readable storage media include Random Access Memory (RAM), Read-only Memory (ROM), Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications. Other applications may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as SCPSD 112 of FIG. 1.

In some embodiments, browser 218 may enable display of a plurality of content layers. In at least one embodiment, browser 218 may determine a theoretical secure content layer and track layers below the theoretical secure content layer. In at least one embodiment, browser 218 may be enabled to modify a transparency of the tracked layers to enable display of the secure content if the secure content is rendered at a bottom-most layer. In any event, browser 218 may employ processes, or parts of processes, similar to those described in conjunction with FIGS. 4-6, to perform at least some of its actions. However, embodiments are not so limited, but rather processes, or parts of processes, similar to those described in conjunction with FIGS. 4-6, may be employed in hardware, software, or a combination thereof.

For example, in some embodiments, a secure aware graphics processing unit (GPU) may be employed. In at least one such embodiment, the secure aware GPU may handle the secure content in the composition of the content layers so that common GPU primitives that may be available to the CPU may not yield the secure content. For example, reading the secure content (e.g., glReadPixels, or the like in a graphics language environment) may refuse to return the bits of the secure content back to the CPU. In at least one embodiment, an error may be returned. In another embodiment, a subset of the secure content may be returned such that not enough data is returned to enable an attacker to retrieve the secure content. For example, an empty opaque surface may be returned.

In other embodiments, the secure aware GPU may be enabled to analyze each image generated and its sources to determine if the output (i.e., the entire image or sub parts of the image) is secure. If the output is secure, the secure aware GPU may indicate that further access by the CPU may return non-useful data to the CPU. In some embodiments, an extension to a graphics language and/or other GPU based rendering tool may be employed to mark content as secure content.

In some embodiments, the secure content may be stored encrypted in RAM using a key only available to the last stages of the rendering pipeline, such as the GPU. In at least one such embodiment, the secure content may not be made available on RAM (accessible or not by the CPU). Such an embodiment may prevent the CPU from accessing decrypted data even in a unified memory architecture environment. In some other highly secure environments, the secure content may be in encrypted form in RAM up to the decode stage, at which point decompressed data of the secure content can be stored in areas that have one or more different security measures (or combinations thereof). Such security measures may include 1) the data may be stored in an area of RAM that may not be available to the CPU (including the operating system), but may be available to parts of a display subsystem to perform presentation (this may include the GPU)—the display subsystem may be made aware of the security of the content by disallowing accesses to the content (e.g., glReadPixels); 2) the data may be encrypted in RAM, and a key may be stored in a location that is available to the display subsystem; 3) RAM may be scrambled, which may deter casual attackers; 4) or the like; 5) or a combination thereof.

Illustrative Network Device

Figure 3:
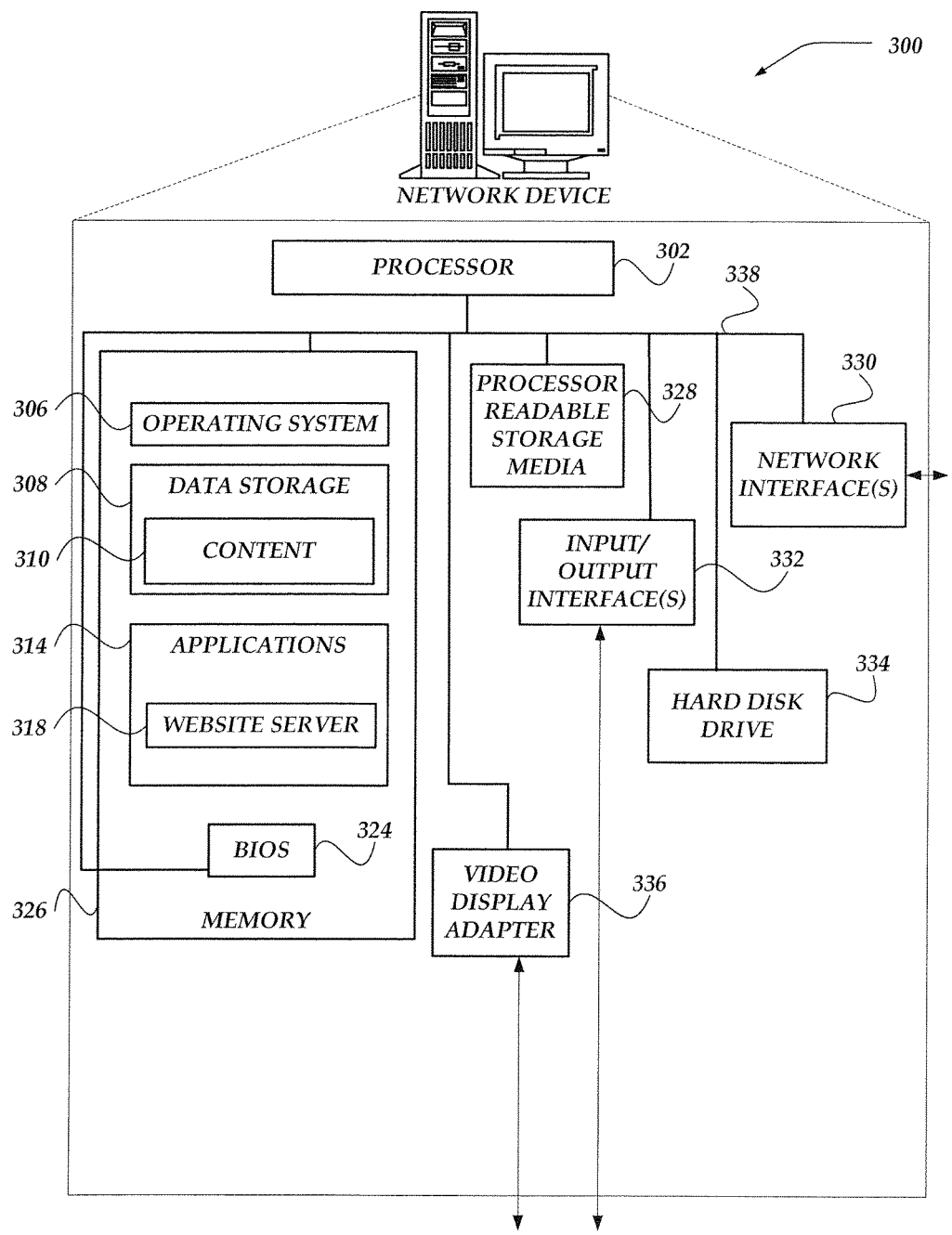
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Additionally, examples of the different components may not be exhaustive and network device configurations may change over time. Network device 300 may be configured to operate as a server, client, peer, a host, or any other device. Network device 300 may represent, for example SCPSD 112 of FIG. 1, and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes different types of storage means, which may include different types of persistent storage and/or different types of transient storage. Persistent storage may include, but is not limited to, one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like. Data storage 308 may also include content 310. Content 310 may include a plurality of content, including secure content and/or unsecure content. In at least one embodiment, content 310 may include a plurality of content layers associated with a web page.

Applications 314 may include computer executable instructions, which may be loaded into memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

In some embodiments, web server 318 may be enabled to provide a plurality of content layers (e.g., content 310) to a client device, such as client device 200 of FIG. 2, upon request for a web page. In at least one embodiment, at least one of the plurality of content layers may include secure content. In some embodiments, web server 318 may provide content and/or keys/licenses for decrypting secure content. As noted above, secure content may be distributed by one means and corresponding keys/licenses may be provided by another means.

General Operation

Figure 4:
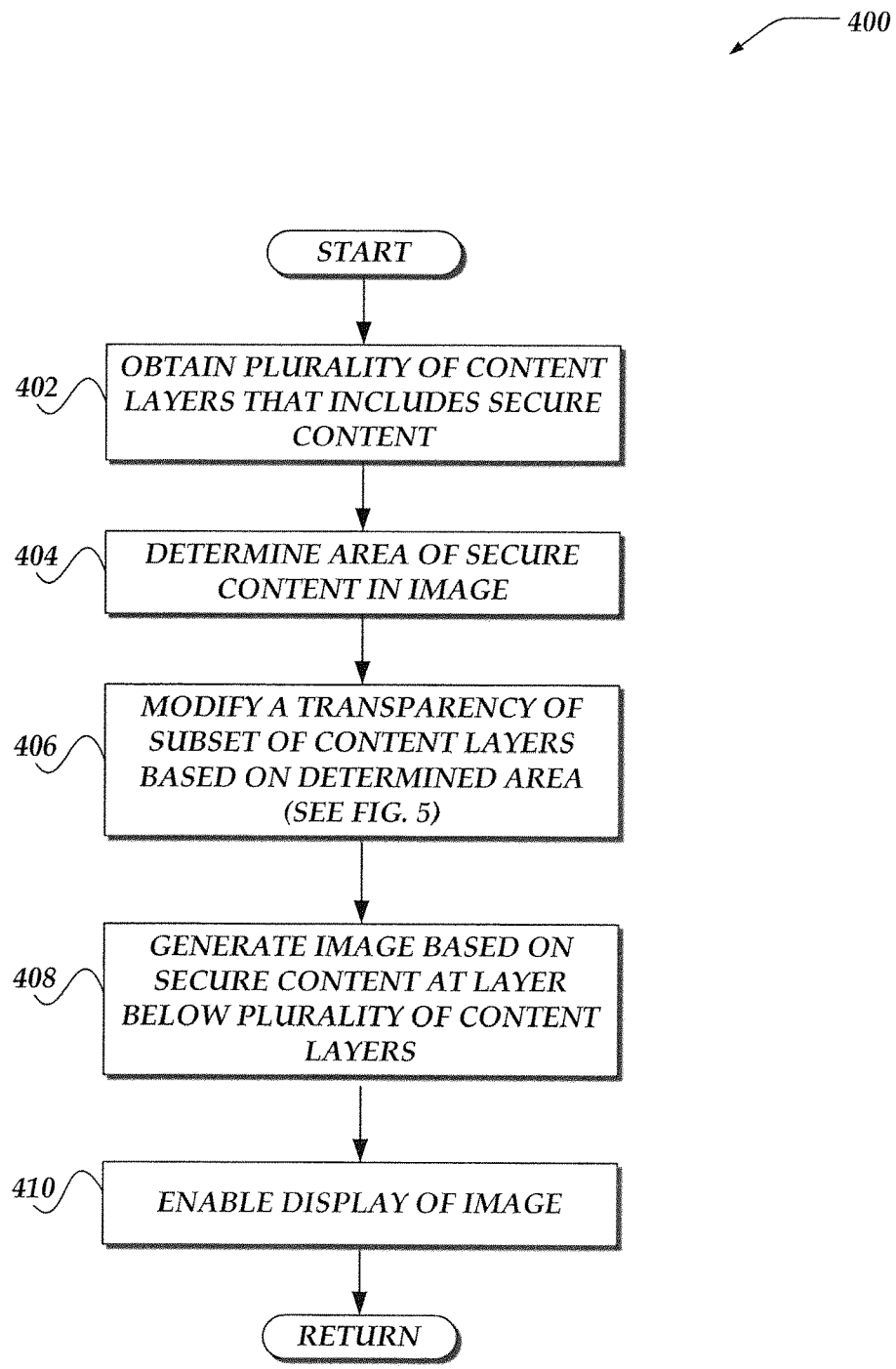
FIG. 4 illustrates a logical flow diagram generally showing an embodiment of an overview process for combining a plurality of overlapping layers, where secure content may be rendered as a layer below the plurality of layers.

The operation of certain aspects of the invention will now be described with respect to FIGS. 4-6. FIG. 4 illustrates a logical flow diagram generally showing an embodiment of an overview process for combining a plurality of overlapping layers, where secure content may be rendered as a layer below the plurality of layers. In some embodiments, process 400 of FIG. 4 may be implemented by and/or executed on one or more network devices, such as client device 200 of FIG. 2.

Process 400 begins, after a start block, at bock 402, where a plurality of content layers may be obtained and/or received for combining into an image for display. In various embodiments, at least one of the plurality of content layers may overlap at least one other content layer. In some embodiments, the plurality of content layers may be associated with a web page. In other embodiments, the image may refer to an image within a window, such as a web page being displaying in a browser window. In at least one embodiment, the plurality of content layers may be received from a network device, such as SCPSD 112 of FIG. 1, if a user of a client device, such as client device 200 of FIG. 2, requests the web page. Each layer may include secure and/or unsecure content.

In some embodiments, the plurality of content layers may be in a z-order stack, where each layer may have a different z-order position in the z-order stack. Accordingly, the z-order stack may have a bottom layer and a top layer. An example of a z-order stack may include Layer_1 to Layer_n, where Layer_1 may be the bottom layer and Layer_n may be the top layer. In this example, Layer_n−1 may have a z-order position less than and/or below the z-order position of Layer_n. Although z-order stack is referenced herein, embodiments are not so limited; but rather, other layering and/or ordering of a plurality of content may be employed.

In various embodiments, at least one of the plurality of content layers may include an area of secure content. As described in more detail above, secure content may include encrypted content, restricted access content, for pay content, or the like. In at least one embodiment, secure content may be determined and/or identified based on a tag and/or other identifier associated with the content of a layer. For example, in one embodiment, content may be encrypted and may include a key that enables decryption of the encrypted content. This key may indicate that the content is secure content. In other embodiments, there may be no key or there may be a plurality of keys. In at least one embodiment, different pieces of the secure content may be encrypted with different keys.

In other embodiments, a license may be obtained. The license may or may not provide one or more keys to decrypt the secure content. In various embodiments, the license may also include other information about the content that may restrict its use, such as, but not limited to, the content must be placed in a secure layer, a time limit restrictions (e.g., 24 hour rentals), number of view restrictions, restrictions on skipping advertisements/commercials, or the like. In some embodiments, protection of the license may include: protection of the keys to minimize having the keys used by a malicious user; protection against tampering (e.g., using signature based mechanisms) to minimize a malicious user from modifying the restrictions; protection against time tampering to minimize replay attacks (e.g., a malicious user "re-renting" the secure content for free over and over by replaying a license acquired only once); or the like.

In at least one embodiment, the area of the secure content may overlap at least another area of at least another one of the plurality of content layers. In some embodiments, overlapping content layers may be in a z-order stack.

In some embodiments, the plurality of content layers may include a plurality of secure content layers. In at least one such embodiment, each of the plurality of secure content layers may be processed as described herein. Non-overlapping secure content layers may be rendered as separate new layers below the plurality of content layers (e.g., at block 408). Over-lapping secure content layers may be processed such that a secure content layer that is for display (i.e., what the user wants to view) may be rendered at a new layer below the plurality of content layers and other secure content layers may be processed similar to other content layers as described herein (e.g., at block 408).

In some other embodiments, content layers may also include other content planes at different three dimensional angles from a view plane. In at least one embodiment, at least one content plane may intersect at least one other content plane so that a portion of the content plane may be visible and another portion of the content plane may not be visible. Various embodiments described herein with reference to modifying overlapped areas of content layers (e.g., at block 406) and combining content layers where an area of secure content is rendered as a new layer below the other content layers (e.g., at block 408) may also be applied to modifying overlapped areas of content planes and combining content planes such that an area of secure content is rendered as a plane below the other content planes.

In yet other embodiments, content may not be mapped into a particular plane or a plane in general. Rather, the content (secure content and/or unsecure content) may be used as a texture that can be mapped to an arbitrary location, or have its content applied based on arbitrary transformations. The positioning of the resulting pixels or the like in the theoretical rendered image may then be calculated. Based on this positioning, the proper alpha blending may then be applied for other secure content to be visible (such as is described below in conjunction with blocks 404, 406, and 408). In at least one embodiment, this texturing may utilize a secure aware graphics processing unit (GPU) as described above, such that the GPU can be made aware of the security of the plane, and apply compositing and/or rendering in a secure fashion so that no parts of the image can be accessed if these parts were created from parts of the secure content.

In any event, process 400 proceeds next to block 404, where an area of the secure content within the image may be determined. In some embodiments, the area may include a location of the secure content within the image. In at least one embodiment, the location may be based on a pixel-based Cartesian coordinate system, which may include sub pixel positions. For example, in at least one embodiment, if the area of the secure content is a square/rectangle, then the location may be an (x,y) pixel location of an upper-left most pixel of the secure content area. In other embodiments, the location may be an (x,y) pixel location of a center pixel of the secure content area.

In other embodiments, the area may include a shape and/or size of the secure content. In at least one embodiment, the shape and/or size may be identified by a tag and/or value associated with the secure content. In some embodiments, if the area is a square/rectangle, then the size may include a width and height of the secure content. In at least one embodiment, the size may be measured in pixels (e.g., x number of pixels wide and y number of pixels high). In other embodiments, the shape and/or size may be identified by an equation, such as if the secure content is non-rectangle (e.g., circle; oval; arbitrary, non-uniform shape; or the like). In at least one embodiment, non-rectangular areas, such as when dealing with cascading style sheets (CSS) transforms, may also be employed.

Although pixel-based Cartesian coordinates provides one example of how the location of the area may be expressed, embodiments are not so limited, but other web-based standards and/or systems may be utilized to determine and/or express the location of the area of the secure content. For example, in some other embodiments, the location may be expressed as points. In yet other embodiments, the location may be determined by what the mark up language may offer for positioning content. It should be noted that the location may be in the form of floating points, integers, or the like.

In some embodiments, block 404 may also determine another area of each content layer that is overlapped by the area of the secure content. In some embodiments, determining the layers that are overlapped by the secure content may be based on a z-order position of each of the plurality of content layers and/or an area of each of the overlapped content layers. For example, the z-order stack position of the secure content layer may be compared with the z-order stack position of other content layer.

Although process 400 of FIG. 4 illustrates a linear flow for an image, embodiments are not so limited. Rather, it is envisioned that in some embodiments some blocks depicted in FIG. 4 may be employed when there is a change and/or update to one or more layers that may affect the resulting image from a previous image that is displayed to a user. For example, process 400 may perform embodiments described at block 404 (along with other blocks depicted in FIG. 4) if there is a change in position in one of the layers, a change in content in one of the layers, a change of transparency, or the like. In some embodiments, when to perform block 404 may be determined based on polling (e.g., each time a single image needs to be rendered), asynchronously (e.g., each time updates are known to have happened), or the like, or any combination thereof. Accordingly, in some embodiments, the area and/or the other areas may be determined based on a change and/or update to one or more layers that may affect the resulting image that is displayed to a user. In at least one such embodiment, the other area of each content layer may be the area that is overlapped by the area of the secure content and the area that changed.

Process 400 continues next at block 406, which is described in more detail below in conjunction with FIG. 5. Briefly, however, at block 406, each area of the at least one content layers (or three dimensional content plane) that is overlapped by the determined area of the secure content may be modified to be transparent. In some embodiments, a transparency of at least a portion of at least a subset of the plurality of content layers may be modified based on the determined area of the secure content. In at least one embodiment, the overlapped layers (i.e., the subset of the plurality of content layers) may include content layers from a bottom layer in the z-order stack up to a theoretical z-order position of the secure content layer. In at least one embodiment, the theoretical z-order position of the secure content (or the theoretical secure content layer) may be a z-order position of the secure content in a z-order stack of content layers, as received.

As described in more detail below, when the image is generated from the plurality of content layers, the secure content may be rendered as a new layer below the other layers. Thus, modifying the transparency of an area of content layers overlapped by the area of the secure content (e.g., a portion of the subset of content layers) may enable the area of secure content to be visible in the image through at least each transparently modified area. In at least one embodiment, modifying the transparency of these content layers may be referred to as punching a hole through these layers so that the secure content can be seen. In some embodiments, a transparency of content layers above the theoretical z-order position of the secure content may not be modified.

For example, assume there are four layers, Layer_1 through Layer_4 (Layer_1 being the bottom of a z-order stack and Layer_4 being the top), and the secure content is at Layer_3. The image may be generated with the secure content at Layer_0 below Layer_1. In this example, a transparency of at least a portion of Layer_1 and Layer_2 may be modified to enable display of the secure content after the layers are combined into the image.

Process 400 proceeds to block 408, where the image may be generated based on the plurality of content layers. In various embodiments, the image may be generated based on at least a combination of the plurality of content layers (or three dimensional content planes), such as by compositing the plurality of content layers. In at least one embodiment, the secure content may be rendered at a new layer (or plane) below the plurality of content layers (or three dimensional content planes). In some embodiments, the secure content may be rendered at a separate layer below a bottom layer of the z-order stack.

In some embodiments, the secure content may remain at the theoretical secure content layer, but may be rendered as a separate layer below the z-order stack (not at the theoretical z-order position of the secure content) when the image is generated. In at least one embodiment, maintaining the secure content at the theoretical secure content layer may maintain web page functionality, such as, but not limited to, mouse rollovers, mouse clicks, or the like. As described in more detail below in conjunction with FIG. 6, in some embodiments, the theoretical secure content layer may also include unsecure content. In at lest one such embodiment, this unsecure content may still be rendered at the theoretical secure content layer.

In at least one embodiment, the relative order of the plurality of content layers may be maintained when the image is generated. Accordingly, in various embodiments, each layer (including the modified layers) may be rendered at a same overlapping position (e.g., z-order position in the z-order stack), but with the secure content rendered as a separate layer below the other content layers. For example, the plurality of content layers may be rendered in the following order, from bottom to top: the secure content, the modified content layers, then other content layers. In at least one embodiment, unsecure content may be rendered at the theoretical secure content layer (described in more detail below in conjunction with FIG. 6) and other content layers may be rendered at layers above the theoretical secure content layer. In at least one embodiment, a transparency of the other content layers may be unmodified based on the area of the secure content (i.e., unmodified at block 406).

In at least one embodiment, the image may be generated by compositing the plurality of content layers. Various embodiments for compositing a plurality of layers may be employed. For example, in one embodiment, the bottom two layers may be composited into a single layer and that layer may be composited with a next higher layer, and so on. In another embodiment, all layers above the secure content may be composited into a single layer prior to compositing that single layer with the secure content layer. However, embodiments are not so limited, and other methods and/or algorithms for compositing the layers may be employed. In some embodiments, modifying the subset of content layers may occur as the layers are being composited to generate the image.

In some embodiments, the image may be generated by hardware, software, and/or any combination thereof, depending on a desired security level and/or security mechanisms available for handling the secure content. In at least one embodiment, the security level may be determined by a provider of the secure content to prevent different types of attacks on the secure content. Such attacks may include, but are not limited to, modified browser source code, modified operating system, injected JavaScript for scraping (e.g., employing the <canvas> object in which secure content may be placed), tampered hardware, or the like. Based on the desired security level and/or the types of attacks to prevent, a security mechanism may be determined for generating the image as described herein. For example, if the desired security level is to prevent modified browser source code from retrieving the secure content, then the operating system may employ embodiments described herein to generate the image for display. In other embodiments, a lowest level (i.e., most secure) security mechanism available on the system for handling the secure content may employ embodiments described herein.

In any event, process 400 continues at block 410, where display of the image (e.g., the composited image) may be enabled. In at least one embodiment, the image may be displayed to a user of the client device. In some embodiments, the image may be displaying in a window, such as a browser window, of the client device. In other embodiments, the image may be provided to another device for display. For example, if the client device is an STB, then the resulting image may be sent to a TV, monitor, or other display device, via a High-Definition Multimedia Interface (HDMI) link, component video, or other connection. In some embodiments, the image may be sent to another device through a secure means, such as, for example, the usage of High-bandwidth Digital Content Protection (HDCP) or other protection technologies. In yet other embodiments, the image may be sent to a remote display device, such as the image may be sent over chromoting, or other remote display technology.

After block 410, process 400 may return to a calling process to perform other actions.

Figure 5:
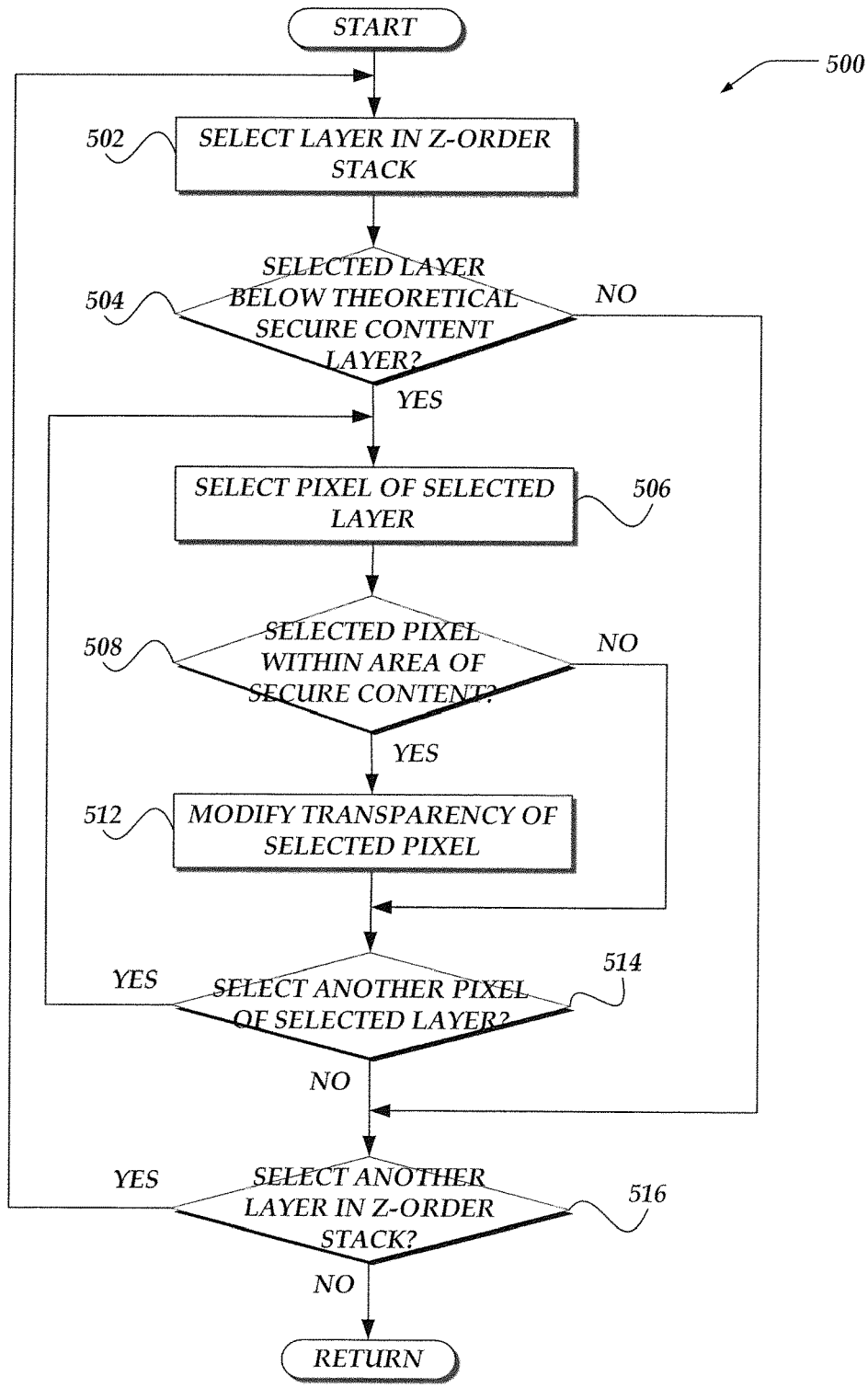
FIG. 5 illustrates a logical flow diagram generally showing an embodiment of a process for modifying at least a portion of at least a subset of rendered content layers to enable display of secure content.

FIG. 5 illustrates a logical flow diagram generally showing an embodiment of a process for modifying at least a portion of at least a subset of rendered content layers to enable display of secure content. In some embodiments, process 500 of FIG. 5 may be implemented by and/or executed on one or more network devices, such as client device 200 of FIG. 2.

Process 500 begins, after a start block, at block 502, where a content layer in the z-order stack may be selected. In some embodiments, a content layer may be selected based on z-order position of the content layer in the z-order stack. In at least one embodiment, an initially selected content layer may be a bottom layer of the z-order stack, where subsequently selected content layers may be a layer with a next higher z-order position. In another embodiment, the initially selected content layer may be a top layer of the z-order stack, where subsequently selected content layers may be a layer with a next lower z-order position.

Process 500 proceeds to decision block 504, where a determination may be made whether the selected layer is below a theoretical secure content layer. In at least one embodiment, the theoretical secure content layer may be a theoretical z-order position of the secure content in the z-order stack. This theoretical z-order position may be a position of the secure content in the z-order stack determined by the web page, browser, or the like. Since web pages may be dynamic, the theoretical z-order position of the secure content (or other content layers) in z-order stack may change depending on the web page. In some embodiments, determining whether the selected layer is below the theoretical secure content layer may be based on a comparison of a z-order position of the selected layer and the theoretical z-order position. For example, assume Layer_1 is the bottom layer in the z-order stack and Layer_n is the top layer—if the selected layer is at Layer_2 and the theoretical secure content layer is at Layer_3, then the selected layer may be below the theoretical secure content layer. If the selected layer is below the theoretical secure content layer, then process 500 may flow to block 506; otherwise, process 500 may proceed to decision block 516.

At block 506, a pixel of the selected layer may be selected. In at least one embodiment, pixels of an image may be selected in a logical pattern, such as, for example, a raster pattern. As described above, the transparency may also be modified based on points, sub-pixel positions, or the like. Accordingly, blocks 506, 508, 512, and 514 may perform similar embodiments based on points, sub-pixel positions, or the like, which may translate to pixels if necessary (e.g., if a GPU performs embodiments as described herein to modify the transparency of content layers).

Process 500 continues next at decision block 508, where a determination may be made whether the selected pixel is within an area of the secure content. In at least one embodiment, the area of the secure content may be determined at block 404 of FIG. 4. In at least one embodiment, whether the selected pixel is within the area of the secure content may be determined based on a comparison of the selected pixel location within the image and the area of the secure content in the same image. In some embodiments, pixel locations within the image may be referenced by Cartesian coordinates of each pixel. For example, assume the area of the secure content is a rectangle with an upper-left most pixel at pixel(10,10), a width of 100 pixels, and a height of 60 pixels (assuming the upper-left most pixel in the image is pixel(0, 0)). If the selected pixel has a location of (8, 15), then the selected pixel may not be within the area of the secure content. However, if the selected pixel has a location of (15, 40), then the selected pixel may be within the area of the secure content. As described above, the location of the area of the secure content may be expressed by other means, such as points, and may be identified as floating points, sub pixels, or the like. If the selected pixel is within the layer location of the secure content, then process 500 may flow to block 512; otherwise, process 500 may flow to decision block 514.

At block 512, a transparency of the selected pixel may' be modified. In some embodiments, a pixel may include a color of the pixel and an opaque/transparency indicator. In some embodiments, the color of the pixel may include a color space of the pixel, such as, but not limited to YCbCR, RGB, or the like. In other embodiments, the opaque/transparency indicator may be the alpha channel with a value between 0 and 1, where 0 indicates that the pixel is transparent (there is no color contribution) and a 1 indicates that the pixel is opaque. In some embodiments, a transparency of the selected pixel may be modified by modifying the alpha channel of the pixel to transparent (e.g., 0).

After block 512 or if it is determined at decision block 508 that the selected pixel is not within the area of the secure content, then process 500 may proceed to decision block 514. At decision block 514, a determination may be made whether to select another pixel of the selected layer. In at least one embodiment, each pixel in the selected layer may be selected in a logical pattern. If another pixel may be selected, then process 500 may loop to block 506 to select another pixel; otherwise, process 500 may flow to decision block 516.

At decision block 516, a determination may be made whether another layer in the z-order stack may be selected. In some embodiments, each layer in the z-order stack may be selected in a logical order, such as, for example, from a bottom layer to a top layer or from a top layer to a bottom layer. If another layer may be selected, then process 500 may loop to block 502 to select another layer; otherwise, process 500 may return to a calling process to perform other actions.

Figure 6:
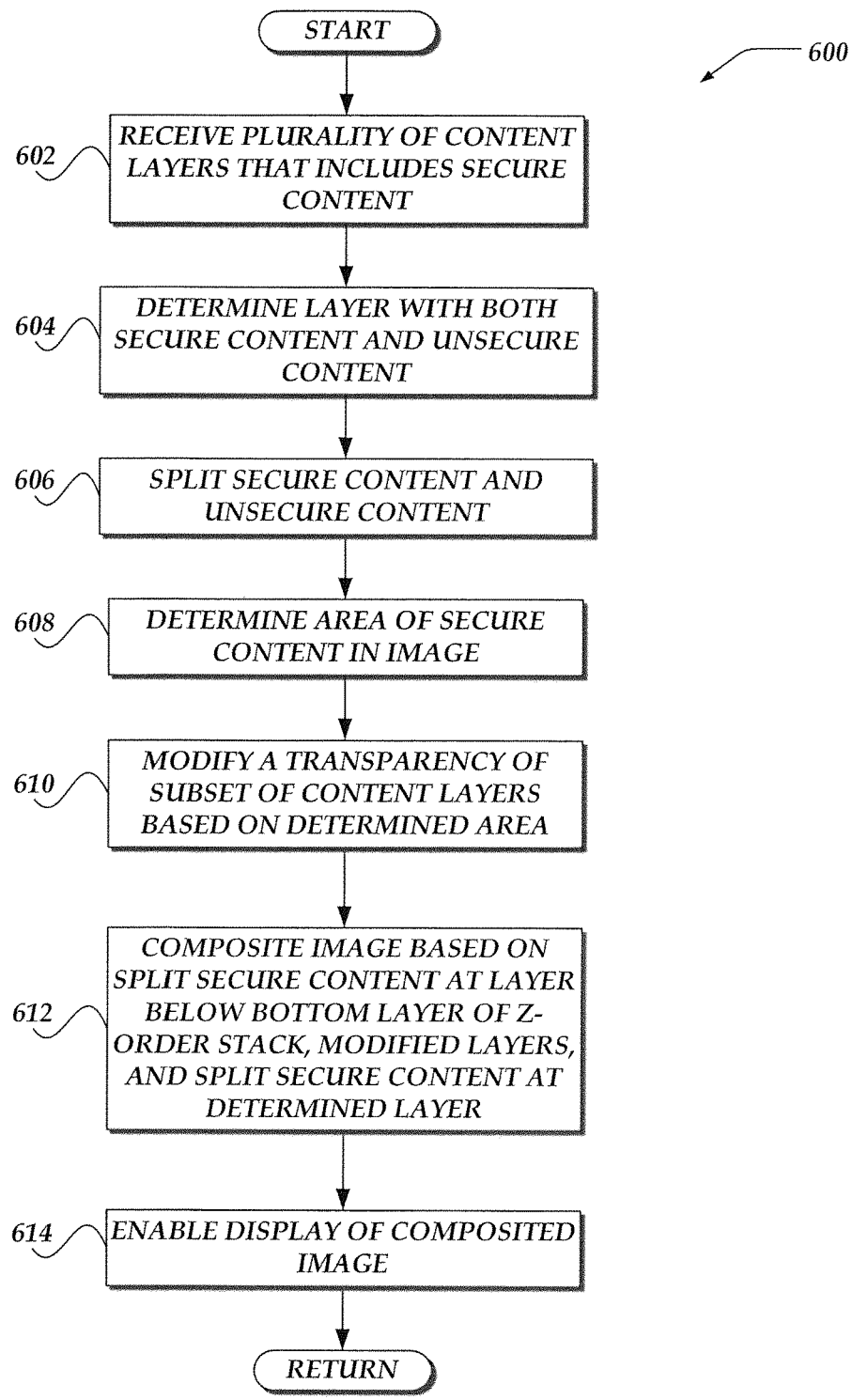
FIG. 6 illustrates a logical flow diagram generally showing an alternative embodiment of a process for combining a plurality of overlapping layers, where secure content may be rendered as a new layer below the plurality of layers.

FIG. 6 illustrates a logical flow diagram generally showing an alternative embodiment of a process for combining a plurality of overlapping layers, where secure content may be rendered as a new layer below the plurality of layers. In some embodiments, process 600 of FIG. 6 may be implemented by and/or executed on one or more network devices, such as client device 200 of FIG. 2.

Process 600 begins, after a start block, at block 602, where a plurality of content layers may be received for generating into an image for display. In various embodiments, at least one of the plurality of content layers may include secure content. In at least one embodiment, block 602 may employ embodiments of block 402 of FIG. 4 to receive the plurality of content layers that includes secure content.

In some embodiments, the plurality of content layers may include a plurality of secure content layers. In various embodiments, the secure content layers may not be able to trust each other and/or may be include different levels of security. Accordingly, in some embodiments, each of the secure content layers may be processed by employing embodiments as described herein such that each secure content layer remains separate. Keeping the secure content layers separate may reduce attacks from one secure layer on another secure layer. In at least one embodiment, if each of the plurality of content layers is a secure content layer, then each layer may remain at a same z-order position (i.e., the theoretical z-order position of each secure content layer) for compositing at block 612.

In any event, process 600 proceeds next to block 604, where a layer with both secure content and unsecure content may be determined. In at least one embodiment, block 604 may employ embodiments of block 402 of FIG. 4 to determine a layer with secure content. An example of a layer with secure and unsecure content may be a layer that displays video to a user. In this example, the video content may be secure content and playback controls may be unsecure content.

Process 600 continues at block 606, where, the secure content and the unsecure content may be split into two different layers, which is described in more detail below. Briefly, however, the unsecure content may remain at the same z-order position (i.e., the theoretical z-order position of the secure content) and the secure content may be positioned in a layer below the bottom of the z-order stack, as described above.

In some embodiments, the secure content may be rendered separate and/or independent from the unsecure content. For example, if the secure content includes video, then the video rendering may be split from the rendering of the playback controls. In at least one embodiment, this split rendering may allow the code that renders the unsecure content to be decoupled and can be run in an untrusted environment. In other embodiments, splitting between the secure content and unsecure content may be dynamic. In at least one embodiment, secure content may be rendered at the theoretical z-order position of the secure content for a predetermined time before being rendered as a layer below a bottom layer of the z-order stack (which may be referred to as secure mode and unsecure mode). Accordingly, secure mode and unsecure mode may be enabled to dynamically switch from one mode to another mode. This dynamic switching may be controlled based on a tag, metadata, a corresponding license, and/or other identifier associated with plurality of content layers.

Process 600 proceeds next to block 608, where an area of the secure content within the image may be determined. In at least one embodiment, block 608 may employ embodiments of block 404 of FIG. 4 to determine an area of the secure content.

Process 600 continues next to block 610, where a transparency of at least a portion of at least a subset of the plurality of content layers may be modified based on the determined area of the secure content. In at least one embodiment, block 610 may employ embodiments of block 406 of FIG. 4 to modify a transparency of a subset of the plurality of content layers.

Process 600 proceeds to block 612, where the plurality of content layers may be composited into the image. As described in more detail above, the secure content (i.e., the split secure content) may be rendered as a layer below a bottom layer of the z-order stack and the modified layers may be rendered above the secure content. In at least one embodiment, the split unsecure content may be rendered above the modified layers at the determined layer (i.e., the theoretical secure content layer) and any remaining content layers of the plurality of content layers may be rendered above the split unsecure content. In at least one embodiment, block 612 may employ embodiments of block 408 to generate and/or composite the image from the plurality of content layers.

Process 600 continues at block 614, where display of the composited image may be enabled. In at least one embodiment, block 614 may employ embodiments of block 406 of FIG. 4 to display the composited image.

After block 614, process 600 may return to a calling process to perform other actions. In at least one of various embodiments, the steps of process 600 may not be performed synchronously with other processes, but may instead be performed independently of other processes.

It will be understood that each block of the flowchart illustration, and combinations of blocks in the flowchart illustration, can be implemented by computer program instructions, the use of GPU compositing, or indirectly by instructing hardware to perform these steps, or any combination thereof. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, GPU, or the like, to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative Embodiments

Figure 7A:
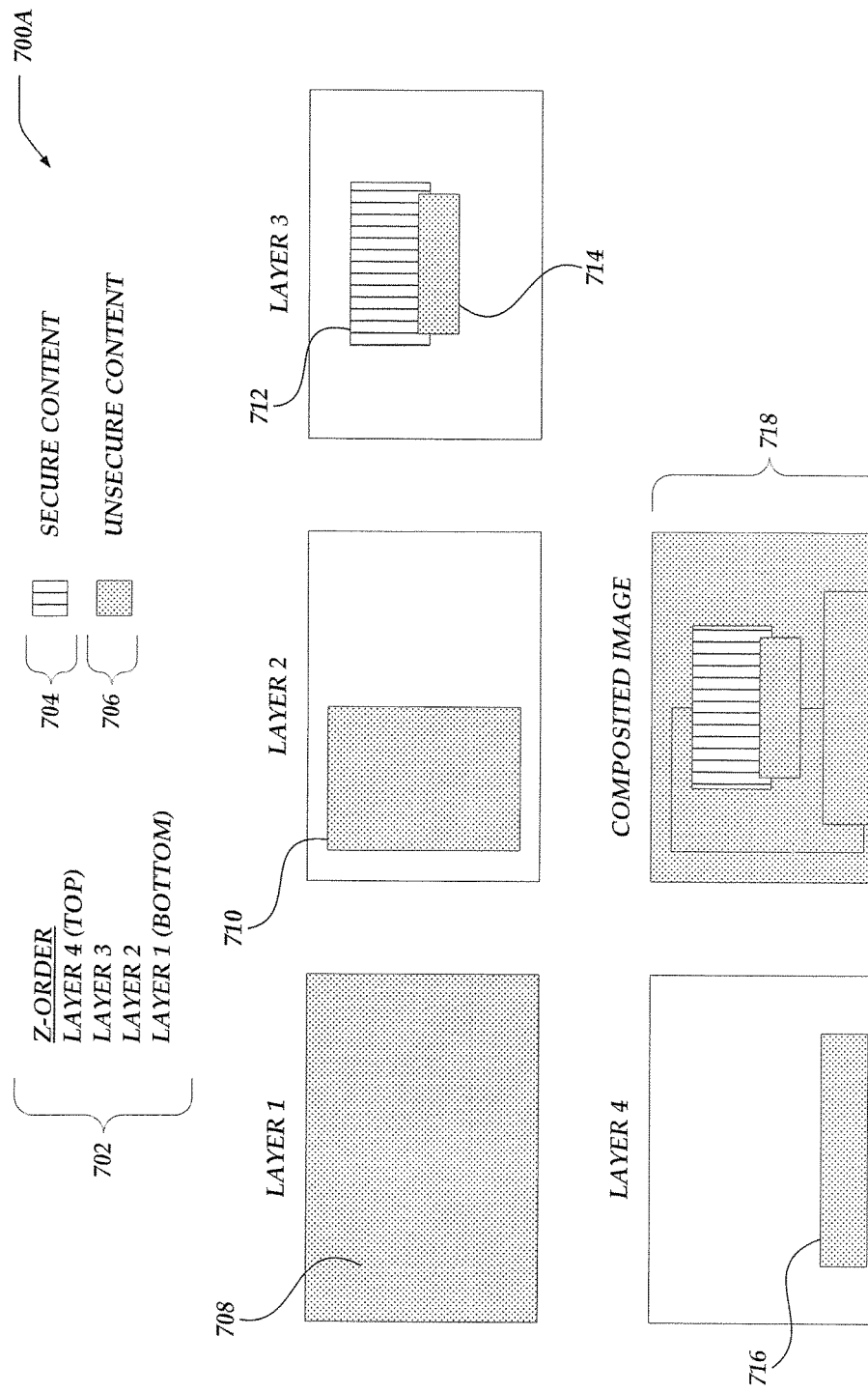
FIGS. 7A-7B show use case illustrations of embodiments of a plurality of content layers.
Figure 7B:
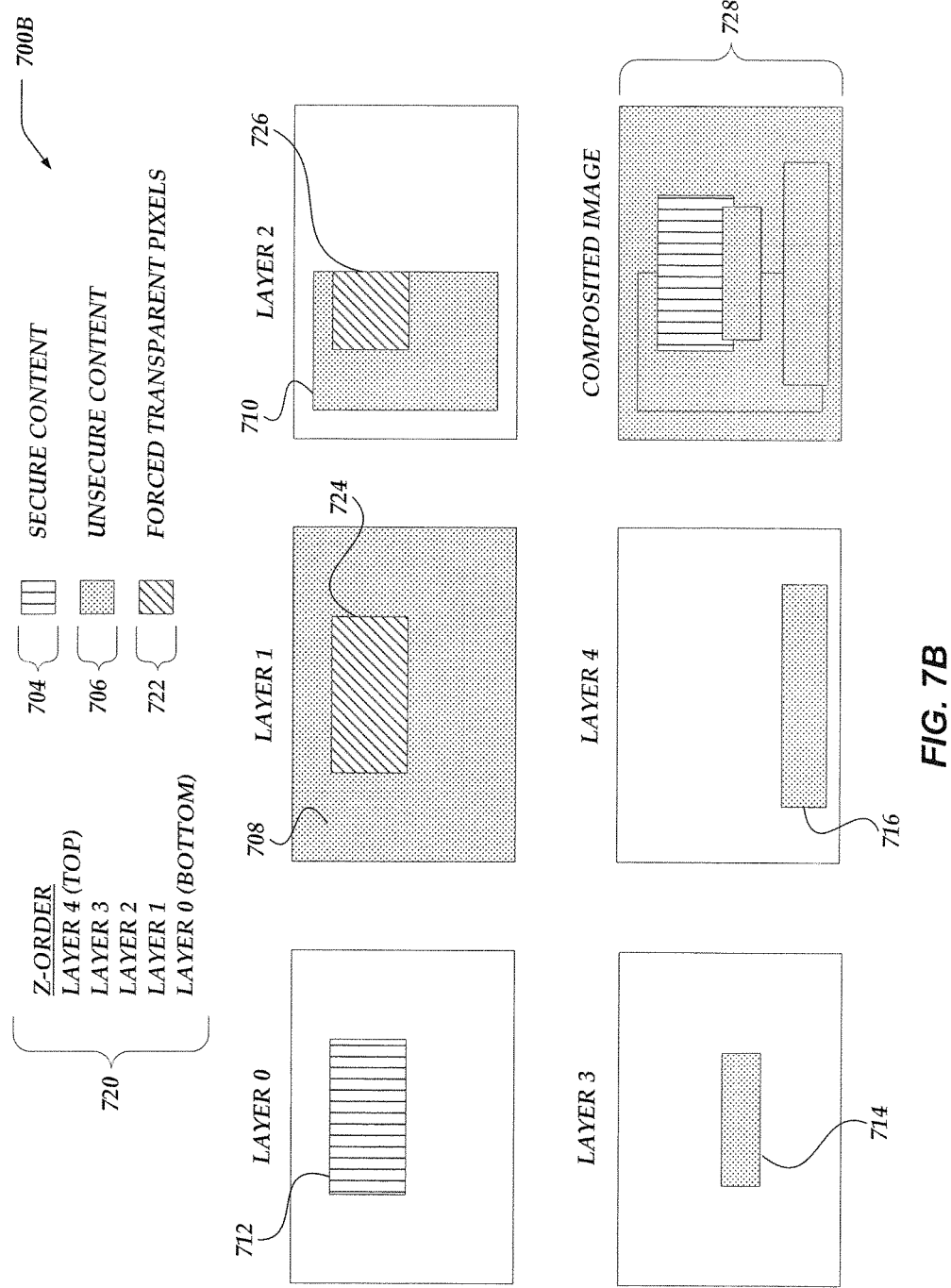

FIGS. 7A-7B show use case illustrations of embodiments of a plurality of content layers. FIG. 7A may illustrate an embodiment of a plurality of content layers associated with a web page received by a client device, such as client devices 102-105, from a network device, such as SCPSD 112 of FIG. 1.

Example 700A may include a plurality of layers, such as, Layer_1, Layer_2, Layer_3, and Layer_4. The plurality of layers may be in z-order stack 702, where Layer_1 is a bottom layer and Layer_4 is a top layer. A layer may include secure content, as illustrated by shading 704, and/or unsecure content, as illustrated by shading 706. As illustrated, Layer_1 may include unsecure content 708 (e.g., a webpage background). Layer_2 may include unsecure content 710. Layer_3 may include secure content 712 (e.g., video content with restricted access) and unsecure content 714 (e.g., playback controls). Layer_4 may include unsecure content 716 (e.g., an advertisement). Image 718 may be a composited image of Layer_1, Layer_2, Layer_3, and Layer_4.

FIG. 7B may illustrate an embodiment of a plurality of content layers modified and composited in accordance with embodiments as described herein. Similar to example 700A, example 700B may include a plurality of layers, such as, Layer_0, Layer_1, Layer_2, Layer_3, and Layer_4. The plurality of layers may be in z-order stack 720, where Layer_0 is a bottom layer and Layer_4 is a top layer. A layer may include secure content, as illustrated by shading 704, and/or unsecure content, as illustrated by shading 706. Also illustrated in FIG. 7B, shading 722 may be utilized to indicate one or more pixels with a modified transparency, i.e., forced transparent pixels (e.g., as described above in conjunction with block 406 of FIG. 4).

Layer_1 may include unsecure content 708, Layer_2 may include unsecure content 710, and Layer_4 may include unsecure content 716. Since Layer_3 in FIG. 7A includes secure content 712 and unsecure content 714, the secure and unsecure content may be split into different layers for compositing. As illustrated, a new layer, Layer_0, may include secure content 712 and unsecure content 714 may be maintained in Layer_3. Layer_0 may be positioned/rendered below Layer_1, as indicated by z-order stack 720.

By employing embodiments as described above, a transparency of at least a portion of the layers from a bottom layer of the z-order stack as received (i.e., Layer_1) up to the theoretical secure content layer (i.e., Layer_3) may be modified. For example, Layer_1 may be modified to include forced transparent pixels 724, which may change pixels of unsecure content 708 to be transparent. Similarly, Layer_2 may be modified to include forced transparent pixels 726. As noted above, unsecure content 714 may be maintained in Layer_3.

Image 728 may be a composited image of Layer_0, Layer_1, Layer_2, Layer_3, and Layer_4. By employing embodiments as described herein, image 728 (where the secure content is at Layer_0) may appear the same as image 718 of FIG. 7A (where the secure content is at Layer_3).

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for managing content with a computing device that is operative to perform actions, comprising:
   obtaining one of a key or a license based on a users authorization to access secure content, the key or the license being configured to enable decryption of the secure content;
   obtaining a plurality of content layers to combine into an image for display, wherein
      a first layer of the plurality of content layers includes an area of secure content and an area of unsecure content, at a theoretical secure content layer;
      at least one of the plurality of content layers includes an area of unsecure content that overlaps the area of secure content in the first layer,
      the area of secure content includes at least one client application authorized to access the secure content, the at least one client application configured to receive and playback the secure content, and
      the secure content includes multimedia content with restricted access received by the at least one client application and from a content provider server configured to stream the multimedia content;
   decrypting the secure content using the key or the license;
   splitting the secure content and the unsecure content included in the first layer into a split secure content layer and a split unsecure content layer;
   rendering the split secure content layer as a new layer below the plurality of content layers and rendering the split unsecure content layer at the theoretical secure content layer,
      wherein rendering the split secure content layer as a new layer below the plurality of content layers includes: determining whether a pixel in the at least one of the plurality of content layers is in the area of unsecure content that overlaps the area of secure content in the first layer; and
      in response to determining the pixel is in the area of unsecure content that overlaps the area of secure content in the first layer modifying the pixel to be transparent;
   generating the image based on at least combining the plurality of content layers, wherein the area of secure content is visible in the image through each modified pixel; and
   enabling the display of the image.

2. The method of claim 1, wherein modifying the pixel to be transparent, further comprises:
   modifying an alpha channel of the pixel to transparent.

3. The method of claim 1, wherein the plurality of content layers are positioned in a z-order stack.

4. The method of claim 1, wherein at least one of the plurality of content layers is below a determined theoretical z-order position of the first layer within a z-order stack of the plurality of content layers.

5. The method of claim 1, wherein at least one of the plurality of content layers overlaps the area of the secure content in the first layer.

6. The method of claim 1, wherein at least one of the plurality of content layers other than the first layer includes unsecure content.

7. A computing device for managing content, comprising:
   a memory for storing data and instructions; and
   a processor that executes the instructions to enable actions, including:
      obtaining one of a key or a license based on a users authorization to access secure content, the key or the license being configured to enable decryption of the secure content;
      obtaining a plurality of content layers to combine into an image for display, wherein
         a first layer of the plurality of content layers includes an area of secure content and an area of unsecure content, at a theoretical secure content layer;
         at least one of the plurality of content layers includes an area of unsecure content that overlaps the area of secure content in the first layer,
         the area of secure content includes at least one client application authorized to access the secure content, the at least one client application configured to receive and playback the secure content, and
         the secure content includes multimedia content with restricted access received by the at least one client application and from a content provider server configured to stream the multimedia content;
      decrypting the secure content using the key or the license;
      splitting the secure content and the unsecure content included in the first layer into a split secure content layer and a split unsecure content layer;
      rendering the split secure content layer as a new layer below the plurality of content layers and rendering the split unsecure content layer at the theoretical secure content layer,
         wherein rendering the split secure content layer as a new layer below the plurality of content layers includes: determining whether a pixel in the at least one of the plurality of content layers is in the area of unsecure content that overlaps the area of secure content in the first layer; and
         in response to determining the pixel is in the area of unsecure content that overlaps the area of secure content in the first layer modifying the pixel to be transparent;
      generating the image based on at least combining the plurality of content layers, wherein the area of secure content is visible in the image through each modified pixel; and
      enabling the display of the image.

8. The computing device of claim 7, modifying the pixel to be transparent, further comprises:
   modifying an alpha channel of the pixel to transparent.

9. The computing device of claim 7, wherein the plurality of content layers are positioned in a z-order stack.

10. The computing device of claim 7, wherein at least one of the plurality of content layers is below a determined theoretical z-order position of the first layer within a z-order stack of the plurality of content layers.

11. The computing device of claim 7, wherein at least one of the plurality of content layers overlaps the area of the secure content in the first layer and includes unmodified transparency.

12. The computing device of claim 7, wherein at least one of the plurality of content layers other than the first layer includes unsecure content.

13. A processor readable non-transitory storage media that includes instructions for managing content, where in the execution of the instructions by a process enables actions, comprising:
- obtaining one of a key or a license based on a users authorization to access secure content, the key or the license being configured to enable decryption of the secure content;
- obtaining a plurality of content layers to combine into an image for display, wherein
  - a first layer of the plurality of content layers includes an area of secure content and an area of unsecure content, at a theoretical secure content layer;
  - at least one of the plurality of content layers includes an area of unsecure content that overlaps the area of secure content in the first layer,
  - the area of secure content includes at least one client application authorized to access the secure content, the at least one client application configured to receive and playback the secure content, and
  - the secure content includes multimedia content with restricted access received by the at least one client application and from a content provider server configured to stream the multimedia content;
- decrypting the secure content using the key or the license;
- splitting the secure content and the unsecure content included in the first layer into a split secure content layer and a split unsecure content layer;
- rendering the split secure content layer as a new layer below the plurality of content layers and rendering the split unsecure content layer at the theoretical secure content layer,
  - wherein rendering the split secure content layer as a new layer below the plurality of content layers includes: determining whether a pixel in the at least one of the plurality of content layers is in the area of unsecure content that overlaps the area of secure content in the first layer; and
  - in response to determining the pixel is in the area of unsecure content that overlaps the area of secure content in the first layer modifying the pixel to be transparent;
- generating the image based on at least combining the plurality of content layers, wherein the area of secure content is visible in the image through each modified pixel; and
- enabling the display of the image.

14. The media of claim 13, wherein modifying the pixel to be transparent, further comprises:
modifying an alpha channel of the pixel to transparent.

15. The media of claim 13, wherein the plurality of content layers are positioned in a z-order stack.

16. The media of claim 13, wherein at least one of the plurality of content layers is below a determined theoretical z-order position of the first layer within a z-order stack of the plurality of content layers.

17. The media of claim 13, wherein at least one of the plurality of content layers includes unmodified transparency.

* * * * *